(12) United States Patent
Karakotsios et al.

(10) Patent No.: US 9,691,000 B1
(45) Date of Patent: *Jun. 27, 2017

(54) ORIENTATION-ASSISTED OBJECT RECOGNITION

(71) Applicant: Amazon Technologies, Inc., Reno, NV (US)

(72) Inventors: Kenneth M. Karakotsios, San Jose, CA (US); Volodymyr V. Ivanchenko, Mountain View, CA (US); Isaac S. Noble, Soquel, CA (US); Dong Zhou, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/665,918

(22) Filed: Mar. 23, 2015

Related U.S. Application Data

(63) Continuation of application No. 13/525,030, filed on Jun. 15, 2012, now Pat. No. 8,988,556.

(51) Int. Cl.
*H04N 5/76* (2006.01)
*H04N 5/225* (2006.01)
(Continued)

(52) U.S. Cl.
CPC ......... *G06K 9/4604* (2013.01); *G06K 9/6202* (2013.01); *G06T 7/004* (2013.01)

(58) Field of Classification Search
CPC .... H04N 7/181; H04N 7/185; H04N 5/23251; H04N 5/23254; H04N 5/23258; H04N 5/23264; H04N 5/2327; H04N 2201/0012; G06K 9/46–9/527; G06K 9/62–9/726

USPC ....... 705/22, 10; 709/203; 348/207.1, 222.1, 348/207.11, 116, 14.01, 14.02, 14.03, 47, 348/231, 129, 130, 137, 161, 231.2
See application file for complete search history.

(56) References Cited

U.S. PATENT DOCUMENTS

2004/0075743 A1  4/2004  Chatani et al.
2006/0181605 A1  8/2006  Boncyk et al.
(Continued)

OTHER PUBLICATIONS

US Non-Final Office Action dated Dec. 30, 2013 issued in U.S. Appl. No. 13/525,030.
(Continued)

*Primary Examiner* — Xi Wang
(74) *Attorney, Agent, or Firm* — Polsinelli LLP (57) ABSTRACT

A user attempting to obtain information about an object can capture image information including a view of that object, and the image information can be used with a matching or identification process to provide information about that type of object to the user. Information about the orientation of the camera and/or device used to capture the image can be provided in order to limit an initial search space for the matching or identification process. In some embodiments, images can be selected for matching based at least in part upon having a view matching the orientation of the camera or device. In other embodiments, images of objects corresponding to the orientation can be selected. Such a process can increase the average speed and efficiency in locating matching images. If a match cannot be found in the initial space, images of other views and categories can be analyzed as well.

20 Claims, 8 Drawing Sheets

(51) Int. Cl.
    *H04N 5/228*     (2006.01)
    *H04N 7/14*     (2006.01)
    *H04N 7/18*     (2006.01)
    *G06K 9/46*     (2006.01)
    *G06K 9/62*     (2006.01)
    *G06T 7/00*     (2017.01)

(56) References Cited

U.S. PATENT DOCUMENTS

| | | | | |
|---|---|---|---|---|
| 2008/0056535 | A1* | 3/2008 | Bergmann | G01C 21/30 |
| | | | | 382/103 |
| 2009/0015702 | A1* | 1/2009 | Garcia Alonso | H04N 5/23293 |
| | | | | 348/333.02 |
| 2009/0028440 | A1* | 1/2009 | Elangovan | G06K 9/6202 |
| | | | | 382/216 |
| 2009/0059007 | A1 | 3/2009 | Wagg et al. | |
| 2009/0185746 | A1 | 7/2009 | Mian et al. | |
| 2009/0256947 | A1* | 10/2009 | Ciurea | G06F 3/0488 |
| | | | | 348/333.12 |
| 2009/0267895 | A1* | 10/2009 | Bunch | G06F 3/0386 |
| | | | | 345/157 |
| 2009/0278949 | A1 | 11/2009 | McMahan et al. | |
| 2009/0282025 | A1 | 11/2009 | Winter et al. | |
| 2009/0299961 | A1 | 12/2009 | Lo | |
| 2010/0183229 | A1* | 7/2010 | Ruzon | G06T 7/0028 |
| | | | | 382/197 |
| 2010/0217678 | A1 | 8/2010 | Goncalves | |
| 2011/0199479 | A1 | 8/2011 | Waldman | |
| 2011/0215147 | A1 | 9/2011 | Goncalves | |
| 2012/0299961 | A1* | 11/2012 | Ramkumar | G06F 17/30047 |
| | | | | 345/632 |
| 2013/0258117 | A1 | 10/2013 | Penov et al. | |

OTHER PUBLICATIONS

US Final Office Action dated Jun. 24, 2014 issued in U.S. Appl. No. 13/525,030.
US Notice of Allowance dated Nov. 25, 2014 issued in U.S. Appl. No. 13/525,030.

* cited by examiner

ORIENTATION-ASSISTED OBJECT RECOGNITION

CROSS-REFERENCE TO RELATED APPLICATIONS

This application is a continuation of U.S. patent application Ser. No. 13/525,030, filed Jun. 15, 2012 entitled "ORIENTATION-ASSISTED OBJECT RECOGNITION" which is hereby incorporated herein by reference.

BACKGROUND

Users are increasingly utilizing electronic devices to obtain various types of information. For example, a user wanting to obtain information about a book can capture an image of the cover of the book and upload that image to a book identification service for analysis. In many cases, the cover image will be matched against a set of two-dimensional images including views of objects from a particular orientation. While books are relatively easy to match, as a user will generally capture an image of the cover of the book with the cover relatively centered and upright in the image, other objects are not as straightforward. For example, an object such as a pair of boots might be imaged from several different orientations, with many of those orientations not matching the orientation of a stored image for that type or style of boot. For example, a top view of a pair of boots will look substantially different than a side view of the pair of boots, which can cause problems if an image of the pair of boots used for image matching only represents one view. In some cases a matching algorithm might utilize multiple views of various products to assist with the matching, but providing additional views rapidly expands the number of images that must be searched, which increases the amount of latency in receiving results, requires more processing power and storage, and can potentially result in more false positives through matching with these additional images.

BRIEF DESCRIPTION OF THE DRAWINGS

Various embodiments in accordance with the present disclosure will be described with reference to the drawings, in which:

FIGS. 4(*a*), 4(*b*), 4(*c*), and 4(*d*) illustrate example orientation differences that can be accounted for and/or utilized in accordance with various embodiments;

FIGS. 5(*a*) and 5(*b*) illustrate portions of an example process for recognizing an object using orientation information that can be used in accordance with various embodiments;

FIGS. 6(*a*) and 6(*b*) illustrate an example approach to assisting a user in capturing an acceptable image of an object based at least in part upon the determined orientation, which can be used in accordance with various embodiments;

DETAILED DESCRIPTION

Systems and methods in accordance with various embodiments of the present disclosure overcome one or more of the above-referenced and other deficiencies in conventional approaches to identifying various types of items or objects using an electronic device. In particular, various embodiments enable a user to capture image information (e.g., still images or video) about an object of interest and receive information about items that are determined to match that object based at least in part on the image information. Further, various embodiments can attempt to determine an orientation of the camera and/or computing device used to capture the image information in order to attempt to reduce the potential search space for the matching process. For example, certain types of objects are typically oriented or posed in a certain way, such as where those objects have what would generally be referred to as a "top" and a "bottom," among other such orientations. By determining the orientation of the device, such as whether a primary axis of the camera lens is substantially horizontal or substantially vertical, a determination can be made as to the view of the object that likely is contained in the image (e.g., a top-down view, a perspective view, or a side view). Based at least in part upon this information, the set of images to be used for matching the object can be reduced to images that include that type of view (e.g., a side view). Further, certain objects are primarily associated with a particular camera orientation, such as paintings primarily being taken from a side or front view rather than a top-down view. The orientation thus can also be used to limit images for the types of object to be matched. In some embodiments, distance and/or size information for an object represented in an image can be obtained as well, in order to determine a scale of the object. Such approaches can limit the initial search space to attempt to increase the accuracy of search results, as orientation or view information can be used to eliminate potential incorrect matches. Such approaches can also, on average, provide faster results and utilize fewer resources. If a match cannot be found in the limited search space, the space can be expanded until a match is found or all appropriate images have been analyzed. Such an approach does not reduce the likelihood of finding a match, as all images can still be compared, but attempts to improve the speed and efficiency of the matching process, among other such aspects.

Various other functions and advantages are described and suggested below as may be provided in accordance with the various embodiments.

Figure 1:
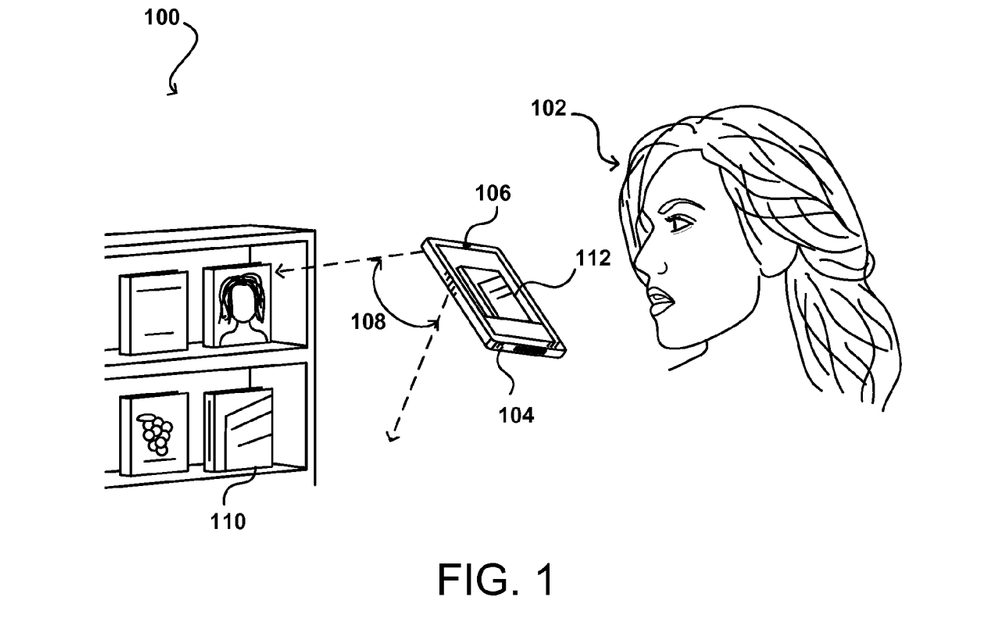
FIG. 1 illustrates an example environment in which aspects of the various embodiments can be that can be utilized.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 2:
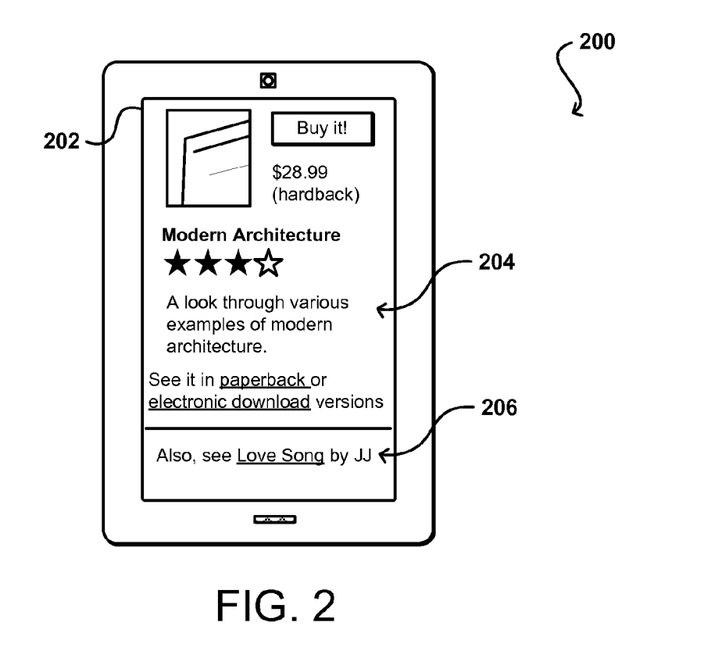
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

Figure 3:
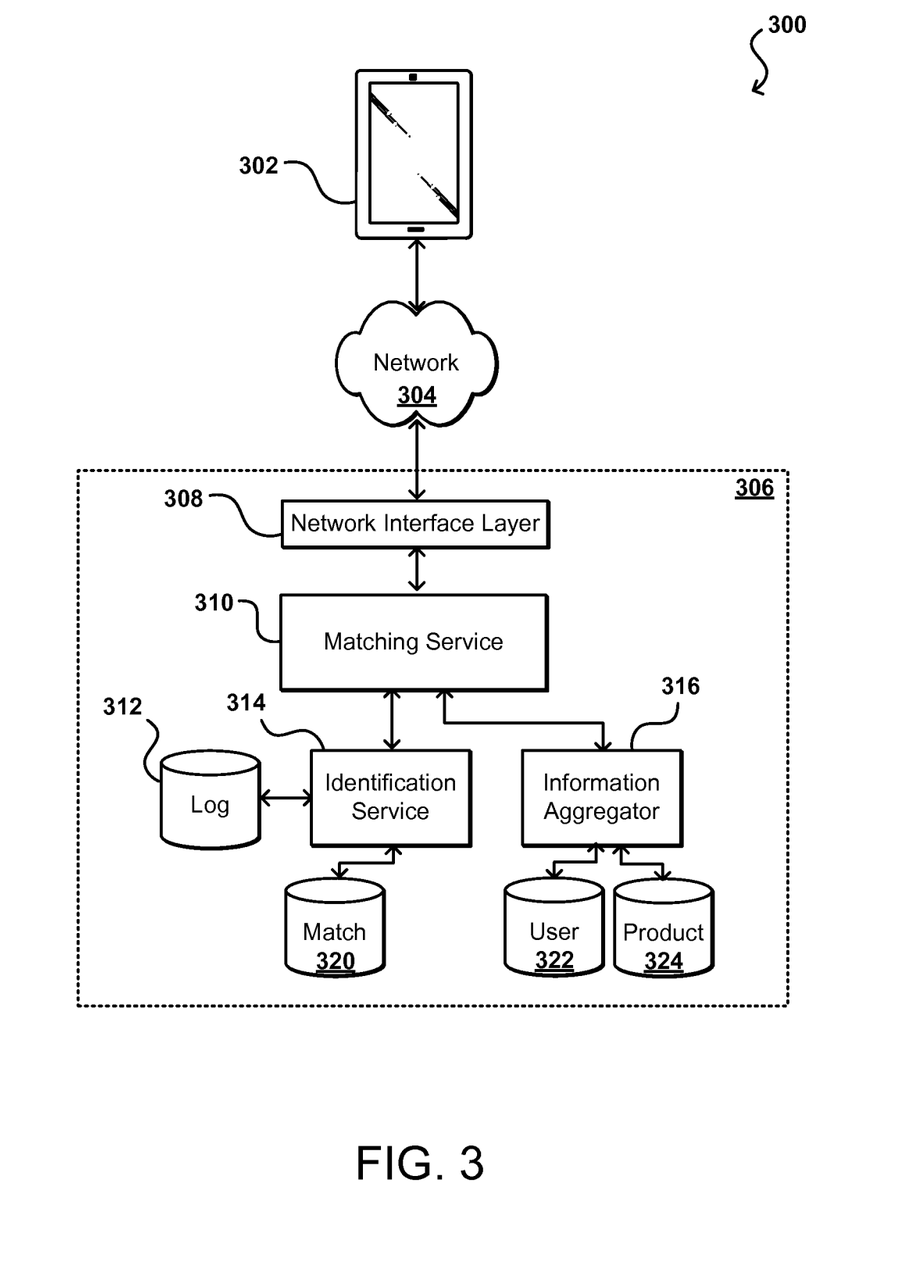
FIG. 3 illustrates example system for identifying items and providing information about those items that can be utilized in accordance with various embodiments.

As discussed, information such as that illustrated in FIG. 2 can be located by streaming (or otherwise transferring) an image, video, and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture audio and/or video information around the device, and can send at least a portion of that audio and/or video information across at least one appropriate network 304 to attempt to obtain information for one or more objects, persons, or occurrences within a field of view of the device. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of image data is obtained in order to obtain a set of results. In other embodiments, image data can be streamed or otherwise transmitted as quickly as possible in order to provide near real-time results to a user of the computing device.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 310 as illustrated in FIG. 3. A matching service in this example includes components operable to receive image data about an object, analyze the image data, and return information relating to people, products, places, or things that are determined to match objects in that image data.

The matching service 310 in this example can cause information to be sent to at least one identification service 314, device, system, or module that is operable to analyze the image data and attempt to locate one or more matches for objects reflected in the image data. In at least some embodiments, an identification service 314 will process the received data, such as to extract points of interest or unique features in a captured image, for example, then compare the processed data against data stored in a matching data store 320 or other such location. In other embodiments, the unique feature points, image histograms, or other such information about an image can be generated on the device and uploaded to the matching service, such that the identification service can use the processed image information to perform the match without a separate image analysis and feature extraction process. Certain embodiments can support both options, among others. The data in an image matching data store 320 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The matching service 310 can receive information from each contacted identification service 314 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 316 can utilize the aggregated data from the matching service 310 to attempt to locate products, in a product data store 324 or other such location, which are offered through the marketplace and that match, or are otherwise related to, the potential match information. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well. Information for located matches also can be stored in a user data store 322 of other such location, which can be used to assist in determining future potential matches or suggestions that might be of interest to the user. Various other types of information can be returned as well within the scope of the various embodiments.

The matching service 310 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 306 in FIG. 3, that one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the matching service to the client device 302. In some cases, at least some of the functionality of a matching service can also be included on the client device 302, which can provide advantages such as lower latency and the ability to obtain results in areas of less than optimal network connectivity, among other such advantages. In some embodiments, performing actions such as facial recognition can also have the advantage that the user's facial data can be stored locally on the device without having to be exposed to third party services or other such entities.

As mentioned, however, the information used for image matching typically corresponds to an image of an object taken from a particular orientation. While image matching algorithms can attempt to account for a small amount of deviation in orientation, it will be unlikely that an image of a coffee table taken from the top will be able to match stored information for that coffee table where that information corresponds to an image taken from the side of the coffee table, as the unique features of the side of the table will generally not be present in a top view of the table. In order to account for these variations, a matching service can store multiple views of various types of item. As pointed out, however, such an approach increases the number of images to be matched against a query image submitted by a user, such that the matching process can take longer to complete and can consume more memory, processing time, and power, among other such resources.

Figures 4A, 4B, 4C, 4D:
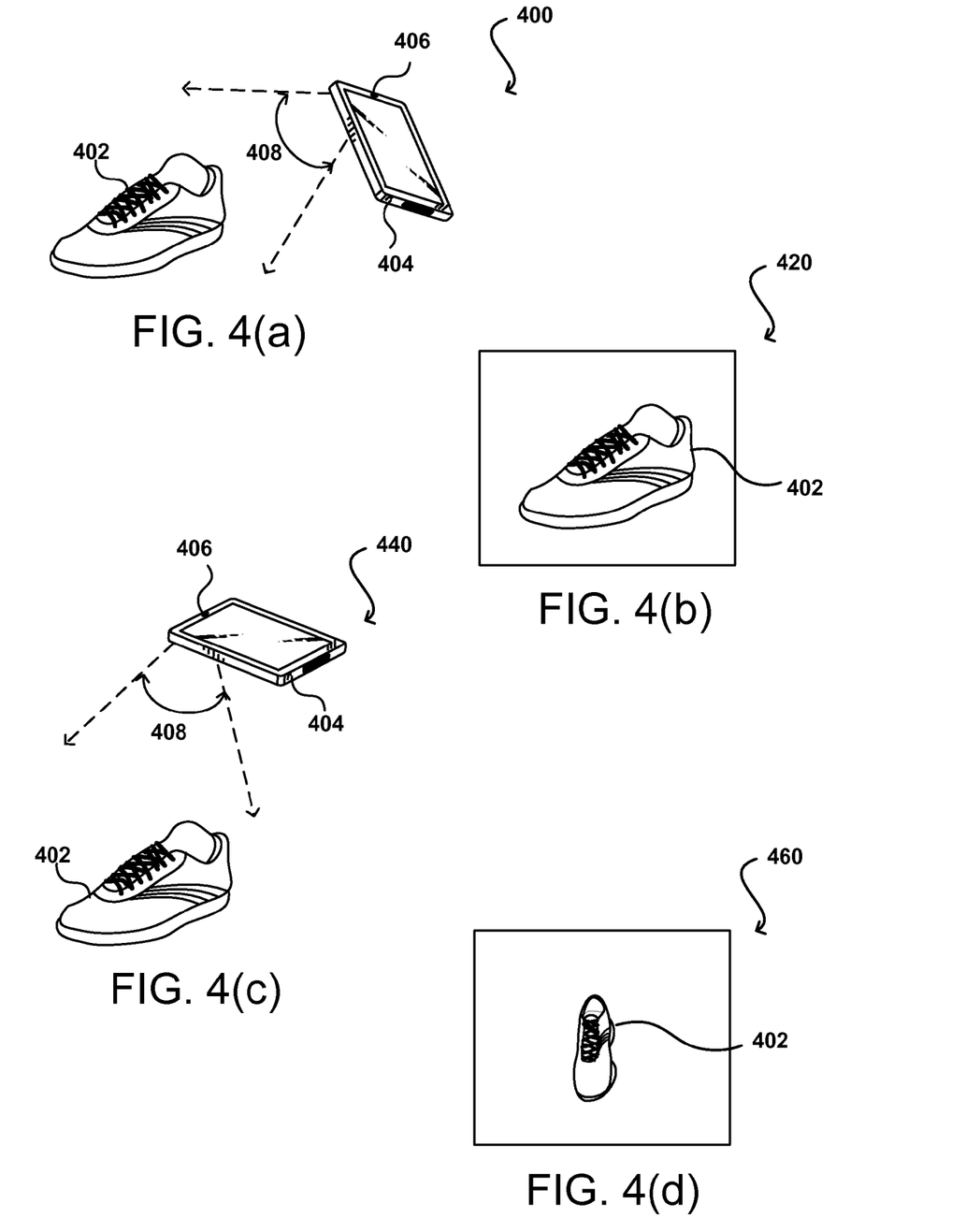

Systems and methods in accordance with various embodiments can attempt to utilize orientation information to at least reduce the initial search space to be used for image matching and/or object recognition. For example, consider the situation 400 of FIG. 4(a). In this example the object of interest 402 is a shoe. The shoe has a sole that is designed to face downward and an opening for a foot that is generally designed to be facing upward. Accordingly, more often than not a shoe will be in an orientation as illustrated in FIG. 4(a). Various other types of objects have similar typical orientations or poses as well. As illustrated in FIG. 4(a), a computing device 404 is oriented with a primary plane of the device in a primarily vertical orientation. If a camera 406 used to capture an image has a primary axis that is substantially orthogonal to the primary plane of the device, and the object of interest 402 is within a field of view 408 of that camera, then it can be determined that the primary axis of the camera in this device orientation is within an angular range of horizontal. Thus, for objects that have a particular orientation, the representation of that object in the image will likely also have a primary orientation. In FIG. 4(a) the object is a shoe that has a primary orientation, such that when the camera and/or device are in the illustrated orientation, it is more likely than not that the view of the shoe in a captured image 420, such as that illustrated in FIG. 4(b), will be a side view, or side perspective view, depending at least in part on the angle with respect to gravity or anther such reference. It is possible, of course, that the shoe might be turned on its side, but the odds of the shoe being in its primary orientation are sufficient to warrant searching for matching images showing a side view first, in order to hopefully more quickly match the object in the image.

Similarly, in the situation 440 of FIG. 4(c) the orientation of the device 404 is such that the primary plane of the device is relatively horizontal, such that the primary axis of the lens of the camera 406 is substantially vertical, or in the direction of gravity. Accordingly, it can be determined that the camera is likely taking a top-down view of an object. Again, for an object such as a shoe, this will more likely than not correspond to a top view of the shoe 402, as illustrated in the image 460 of FIG. 4(d). As can be seen, the views of the same shoe in the two images 420, 460 are significantly different, such that the same image stored by the matching service would be unlikely to match both images, even if the exact same shoe were represented. Accordingly, it can be advantageous to determine which view is likely shown in the image, based at least in part upon the orientation of the device, and then limit the initial search to views of objects matching that view. For example, if the device is such that the view is likely a top-down view, then the matching service can start with top-down view images for matching instead of side view images. Various other views and determinations can be utilized as well within the scope of the various embodiments.

The orientation of a device can be determined in any of a number of different ways. For example, the device might include at least one motion and/or orientation sensor that can assist with the orientation determination. For example, an accelerometer detects and utilizes the direction of gravity, which can be used to determine the approximate orientation of the device at the time an image is captured. Similarly, an electronic compass can give location information in three dimensions, which can be used to determine the orientation of the device. Sensors such as gyroscopes can provide information about a speed and direction of rotation, which can be used with an accelerometer or gyroscope to provide a more accurate orientation determination. Various other types of sensors can be used to determine orientation as well. In some embodiments, the image information might be analyzed to attempt to determine an orientation as well, such as to determine the orientation of visible doors or the relative location of the sun in the captured image information, among other such options. For example, if the device can determine the relative orientation of the sun in an image, the device can determine the relative orientation of the device. Similarly, if the device can determine that a door represented in a captured image is substantially upright, then the device can determine that the device is substantially upright as well. If the computing device knows the relative orientation of one or more cameras with respect to the device, and can determine the orientation of the device with respect to the earth (or another point of reference), the device can determine the relative orientation of the camera at the time the picture was taken.

In some embodiments, the user might indicate to the device (or an application executing on the device) the type of object that is being captured. For example, the user might be utilizing a shoe-specific application, might be browsing a shoe category, or might manually input that the user is capturing an image of a shoe, in order to reduce the search space and improve the speed at which a match can be obtained. In other embodiments where this information may not be available, or where narrowing to a sub-category might be possible, a matching service or other such entity can attempt to use the orientation information to attempt to reduce the number of categories to be searched, at least in an initial phase of the matching process. For example, objects such as paintings, doors, aquariums, televisions, windows, and other such objects might typically be captured in images using a side-view orientation. Objects such as carpet, tile, and hardwood flooring might typically be captured using a top-down orientation. By knowing the orientation of the device, the type of objects to be matched might be adjusted such that objects that typically are captured using a different orientation are at least initially excluded from the image matching process.

Figure 5A:
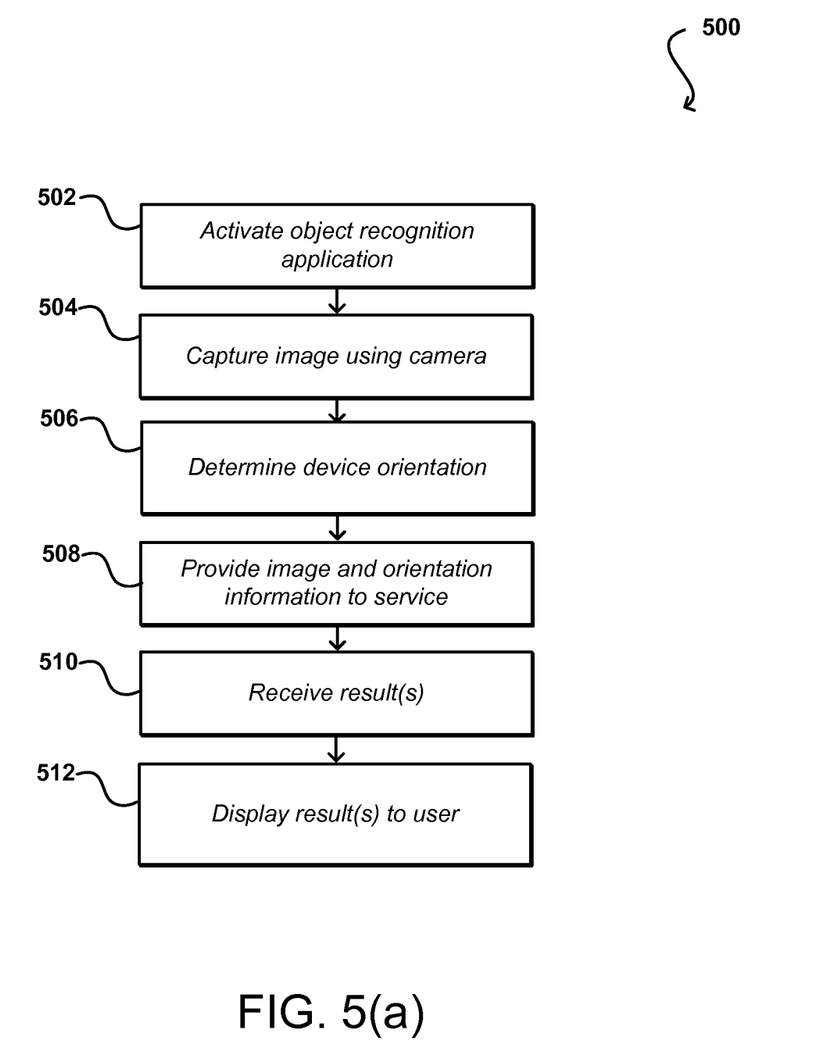

FIG. 5(a) illustrates a first portion 500 of an example process for recognizing an object in captured image information based at least in part upon orientation information, in accordance with at least one embodiment. It should be understood that there can be additional, fewer, or alternative steps performed in similar or alternative orders, or in parallel, within the scope of the various embodiments unless otherwise stated. Further, this portion of the process generally refers to actions performed by the computing device used by the user to capture and/or provide the image information for matching. In this example, an object recognition and/or identification process or application is activated 502 on a computing device. The identification process can be activated manually by a user, such as by the user opening an application, or automatically by the device in response to a detected motion, location, or other such trigger. In other embodiments, object identification might be active during various states of the device, such as an awake state, a standby state, and the like. As part of the object identification process, an indication of a category or type of item, or other such information, might be received or otherwise obtained by the device. As discussed, this indication can be the result of a user selecting or inputting a category or type, a user entering a search term for a type of item in a search tool, a user submitting a navigation request or navigation instruction in order to navigate to a specific page or section of an interface related to that type of item, or the computing device determining a likely type of item based on location, surrounding items, or other such information. Various other indications can be utilized as well. In some embodiments, contextual information can be used to attempt to determine an appropriate category (or set of categories) in which to search for a match. For example, if a device can determine using GPS data, image data, or other such information that the user is in an electronics store or a book store, the device can use this information to determine categories that would likely correspond to objects at that location, in that type of store, etc.

At least one camera of the computing device can be used to capture 504 image information, including one or more images, video, stereoscopic information, etc. At or around the time of image capture, a determination can be made 506 as to the orientation of the device and/or the camera used to capture the image information. As discussed this can include using one or more sensors of the device to determine the orientation of the device, and using this information to determine the orientation of the camera capturing the image information. At least a portion of the image information and the orientation information can be provided 508 to an image matching, object recognition, or other such system or service. As discussed, at least some processing of the image can be performed on the computing device, and in some cases the uploading image information can include a histogram vector, a set of feature points, or other such information useful for matching. In some embodiments, the matching might also be performed on the computing device itself, using image information stored locally or remotely. In response to the information, the computing device can receive 510 information for one or more matching results, if located, and can display 512 at least a portion of the results to the user via a display element of the computing device.

Figure 5B:
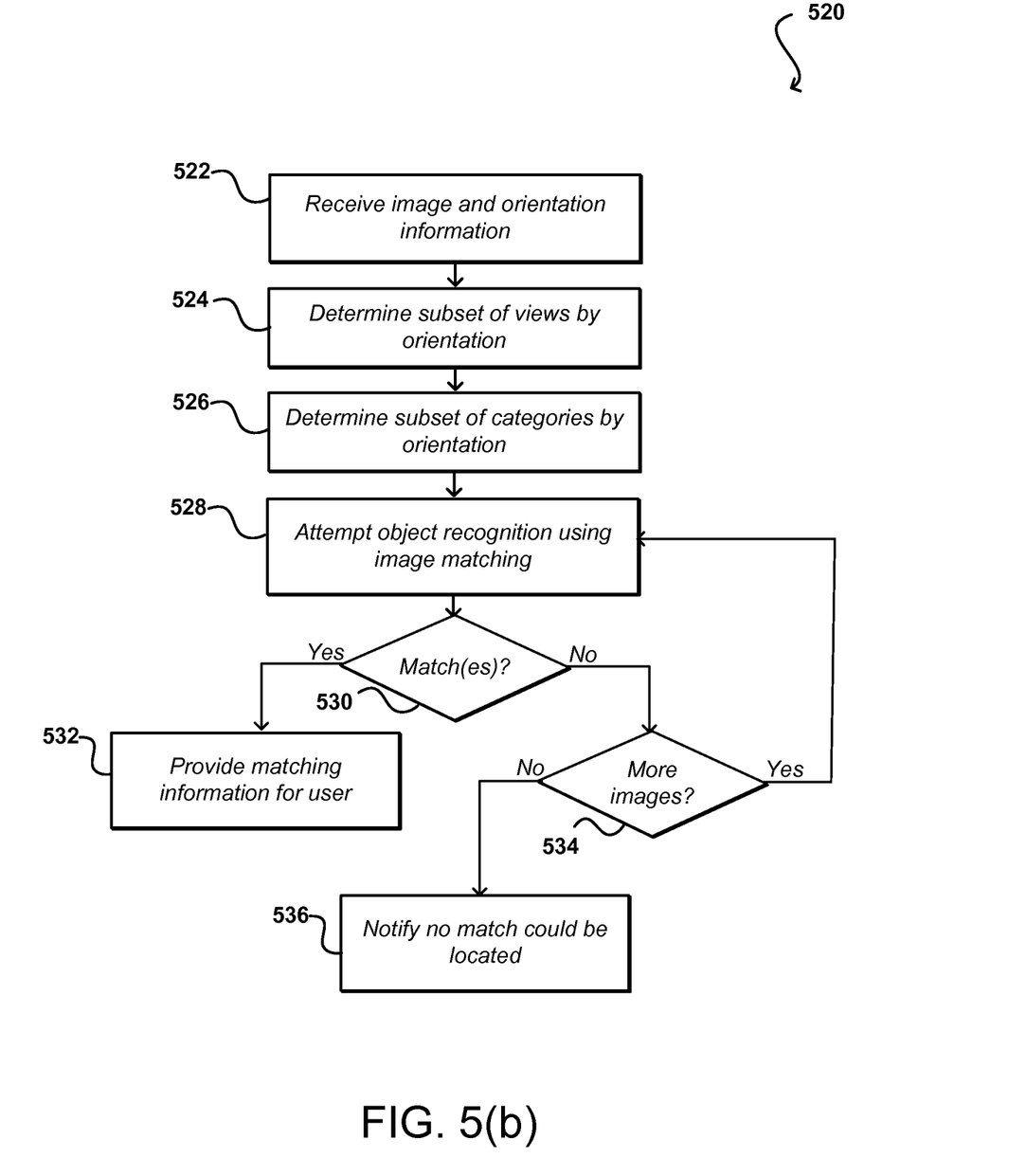

FIG. 5(*b*) illustrates a second portion 520 of the example process, as might be performed by a matching service, object recognition system, or other such process. In this example, image and orientation information is received 522 from a computing device, which can have been obtained using a process such as that discussed with respect to FIG. 5(*a*). Based at least in part upon the orientation information, a matching service, object recognition service, or other such process or entity can determine 524 a subset of potential matching images to analyze as part of the image matching process. If the user identified a category of the object of interest, the category information can be used to further reduce the initial subset of images to be used for matching. Otherwise, in at least some embodiments, the process can also determine 526 a subset, or further limit the original subset, of images to initially analyze using the matching process to categories of items matching the orientation information. The initial subset of images then can be analyzed using an image matching or other such process to attempt to recognize 528 at least one object in the received image information. If at least one matching item is located 530 with at least a minimum level of certainty or confidence, for example, information for the at least one matching item can be provided 532 for display to the user for whom the image information was received. If a match is not located, a determination is made 534 as to whether there are more images to be analyzed, such as images in other categories or with other orientations. If so, the process can continue. If not, the user can be notified 536 that a match was unable to be located and/or an object in the image was unable to be identified. In some cases, the user can be prompted to capture another image from another point of view, as may be based at least in part upon the orientation information for the previously analyzed image.

Figure 6A:
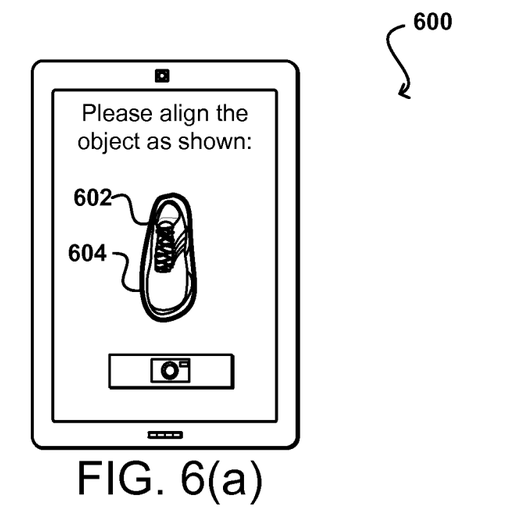
Figure 6B:
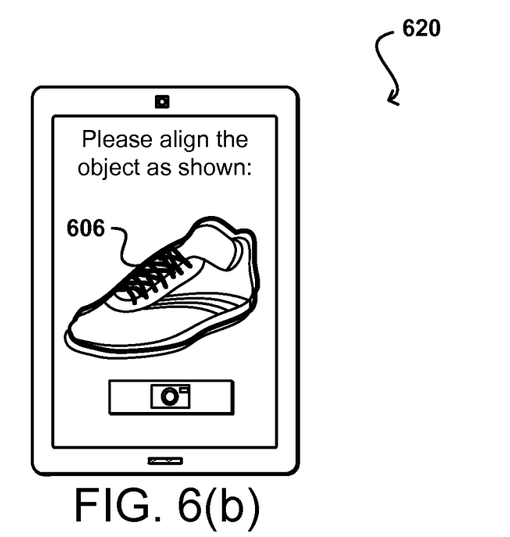

In some embodiments, the orientation of the device can be used to help guide the user in capturing an image. For example, consider the view 600 displayed in FIG. 6(*a*). In this example the user might have indicated a "shoe" category and have the device in a top-down orientation. An application having access to that information might cause an orientation guide 604 to be displayed that is intended to help guide the user to orient a view of the shoe 602 in a certain way so as to assist with the matching process, such as to orient the top-down view of the shoe in a way that matches how images in an image data store were captured. Similarly, FIG. 6(*b*) illustrates a view 620 where a different orientation guide 606 is displayed when a change in the device orientation is detected such that the device would likely capture an image with a side-view orientation. Various other guides and information can be provided as well within the scope of the various embodiments. In some embodiments the user can manipulate, stretch, flip, or otherwise adjust the guide to match the view of the object in the image, and information about the adjusted guide can be provided with the image information to assist with the matching process.

In some embodiments, a determination of a category for an object of interest can cause a client device to determine the appropriate orientation for capturing an image of an object in that category. For example, a shoe might be best captured from the side for matching while a book might best be captured from the front and flooring might be best captured using a top-down view. If the user captured (or is capturing) an image using a different orientation, the device might suggest that the user additionally, or alternatively, capture an image using the determined orientation for that category, in order to improve the likelihood that a successful match can be located.

Similarly, the device (or software having access to image data captured on the device) might perform image analysis to determine the presence of specular reflections, saturations, or other such artifacts that might result from a glare, reflection from a shiny object, etc. In such circumstances, the computing device might prompt the user to adjust the orientation and/or location of the device in order to avoid (or at least minimize) the presence of the artifact, which can improve the quality of the captured image and thus help to improve the accuracy of the matching results.

As mentioned, approaches in accordance with various embodiments can also use techniques such as stereoscopic imaging, auto-focus mechanisms, or distance finding (e.g., sonic) techniques to attempt to determine the size and/or scale of an object, in order to assist with image matching and improve accuracy. For example, the image might include a representation of a particular type and model of car. If the scale of the object can be determined, the matching process might be able to determine whether the object corresponds to an actual car, a miniature toy model of the car, etc. Such information can also be used to select appropriate categories in at least some embodiments.

Figure 7:
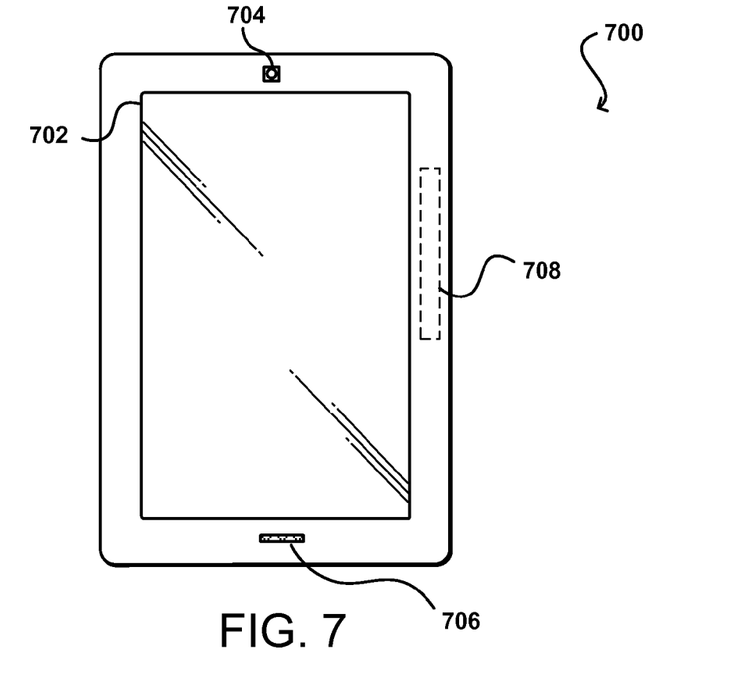
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
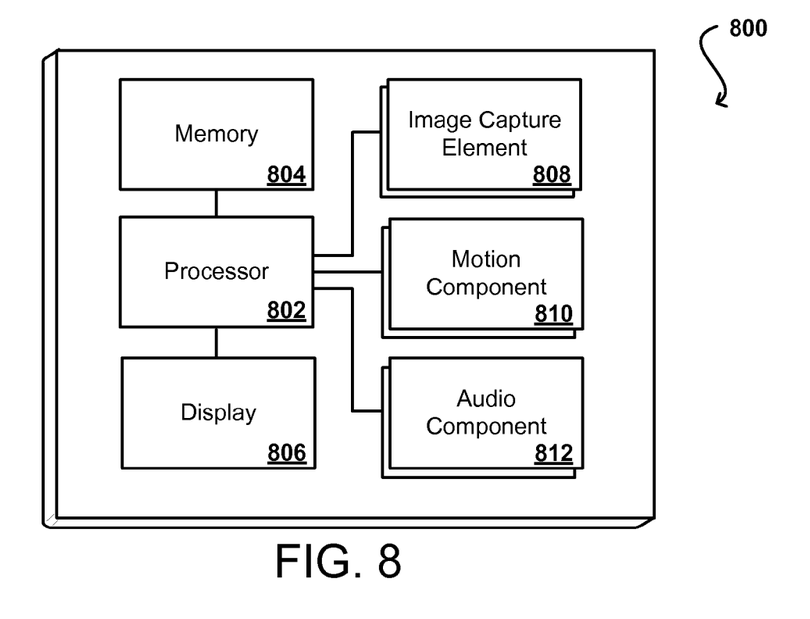
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can also include at least one audio capture component (not shown), such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements 812, such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
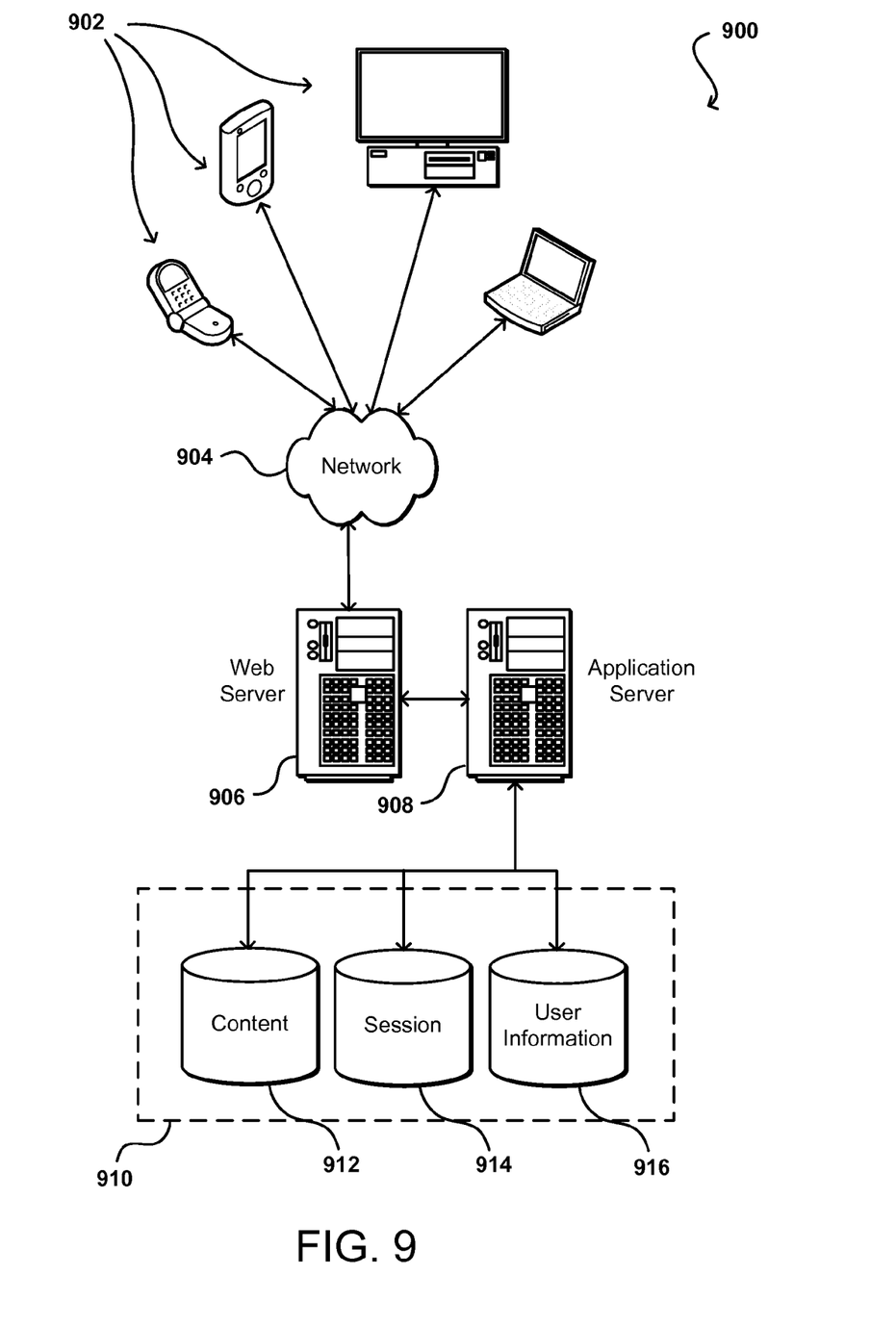
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  receiving, from a computing device, image data, the image data representing an object at a first time;
  receiving contextual data corresponding to the object;
  determining, based at least on the contextual data, an orientation of the computing device relative to the object at approximately the first time;
  determining a first viewing angle of the object;
  providing a notification to change the orientation of the computing device to correspond with the first viewing angle of the object;
  selecting, from a set of reference images of a plurality of objects, a subset of reference images, the subset of reference images having corresponding viewing angles and corresponding reference image data;
  comparing the image data to the reference image data;
  identifying matching image data, from the reference image data, the matching image data representing an item matching the object; and
  providing information about the item.

2. The computer-implemented method of claim 1, further comprising:
  providing an interface to allow a user of the computing device to manually identify the object.

3. The computer-implemented method of claim 2, wherein the interface allows the user to manually identify the object by at least one of pointing to a visual representation of the object on the interface or drawing a boundary around the visual representation of the object on the interface.

4. The computer-implemented method of claim 1, wherein the contextual data corresponds to at least one of a location of the computing device or a distance of the computing device from the object.

5. The computer-implemented method of claim 4, wherein the location of the computing device corresponds to at least one of a GPS location, a street address, or a business establishment associated with a physical location of the computing device.

6. The computer-implemented method of claim 4, further comprising:
  determining a scale of the object based at least on the distance of the computing device from the object.

7. The computer-implemented method of claim 4, wherein determining the first viewing angle of the object comprises:
  determining an orientation of a product proximate the location of the computing device; and
  determining a viewing angle that best captures the product in the determined orientation.

8. The computer-implemented method of claim 1, further comprising:
  providing an option to purchase the item.

9. A computing device, comprising:

a processor; and a memory device including instructions that, when executed by the processor, cause the computing device to:
- receive image data, the image data representing an object at a first time;
- receive contextual data corresponding to the object;
- determine, based at least on the contextual data, an orientation of the computing device relative to the object at approximately the first time;
- determine a first viewing angle of the object;
- provide a notification to change the orientation of the computing device to correspond with the first viewing angle of the object;
- select, from a set of reference images of a plurality of objects, a subset of reference images, the subset of reference images having corresponding viewing angles and corresponding reference image data;
- compare the image data to the reference image data;
- identify matching image data, from the reference image data, that matches the image data, the matching image data representing an item matching the object; and
- provide information about the item.

10. The computing device of claim 9, wherein the instructions further cause the computing device to:
provide an interface to allow a user of the computing device to manually identify the object.

11. The computing device of claim 9, wherein the contextual data corresponds to at least one of a location of the computing device or a distance of the computing device from the object.

12. The computing device of claim 11, wherein the location of the computing device corresponds to at least one of a GPS location, a street address, or a business establishment associated with a physical location of the computing device.

13. The computing device of claim 11, wherein determining the first viewing angle of the object comprises:
- determining an orientation of a product proximate the location of the computing device; and
- determining a viewing angle that best captures the product in the determined orientation.

14. A non-transitory computer-readable storage medium including instructions that, when executed by at least one processor of a computing system, cause the computing system to:
- receive image data, from a computing device, the image data representing an object at a first time;
- receive contextual data corresponding to the object;
- determine, based at least on the contextual data, an orientation of the computing device relative to the object at approximately the first time;
- determine a first viewing angle of the object;
- provide a notification to change the orientation of the computing device to correspond with the first viewing angle of the object;
- select, from a set of reference images of a plurality of objects, a subset of reference images, the subset of reference images having corresponding viewing angles and corresponding reference image data;
- compare the image data to the reference image data;
- identify matching image data, from the reference image data, that matches the image data, the matching image data representing an item matching the object; and
- provide information about the item.

15. The non-transitory computer-readable storage medium of claim 14, wherein the instructions further cause the computing system to:
provide an interface to allow a user of the computing system to manually identify the object by at least one of pointing to a visual representation of the object on the interface or drawing a boundary around the visual representation of the object on the interface.

16. The non-transitory computer-readable storage medium of claim 14, wherein the contextual data corresponds to at least one of a location of the computing device or a distance of the computing device from the object.

17. The non-transitory computer-readable storage medium of claim 16, wherein the location of the computing device corresponds to at least one of a GPS location, a street address, or a business establishment associated with a physical location of the computing device.

18. The non-transitory computer-readable storage medium of claim 16, wherein the instructions further cause the computing system to:
determine a scale of the object based at least on the distance of the computing device from the object.

19. The non-transitory computer-readable storage medium of claim 16, wherein determining the first viewing angle of the object comprises:
- determining an orientation of a product proximate the location of the computing device; and
- determining a viewing angle that best captures the product in the determined orientation.

20. The non-transitory computer-readable storage medium of claim 14, wherein the instructions further cause the computing system to:
provide an option to purchase the item.

* * * * *